(No Model.)
A. S. TOPPING.
INTERCHANGEABLE WEEDER AND RAKER.
No. 572,935. Patented Dec. 8, 1896.
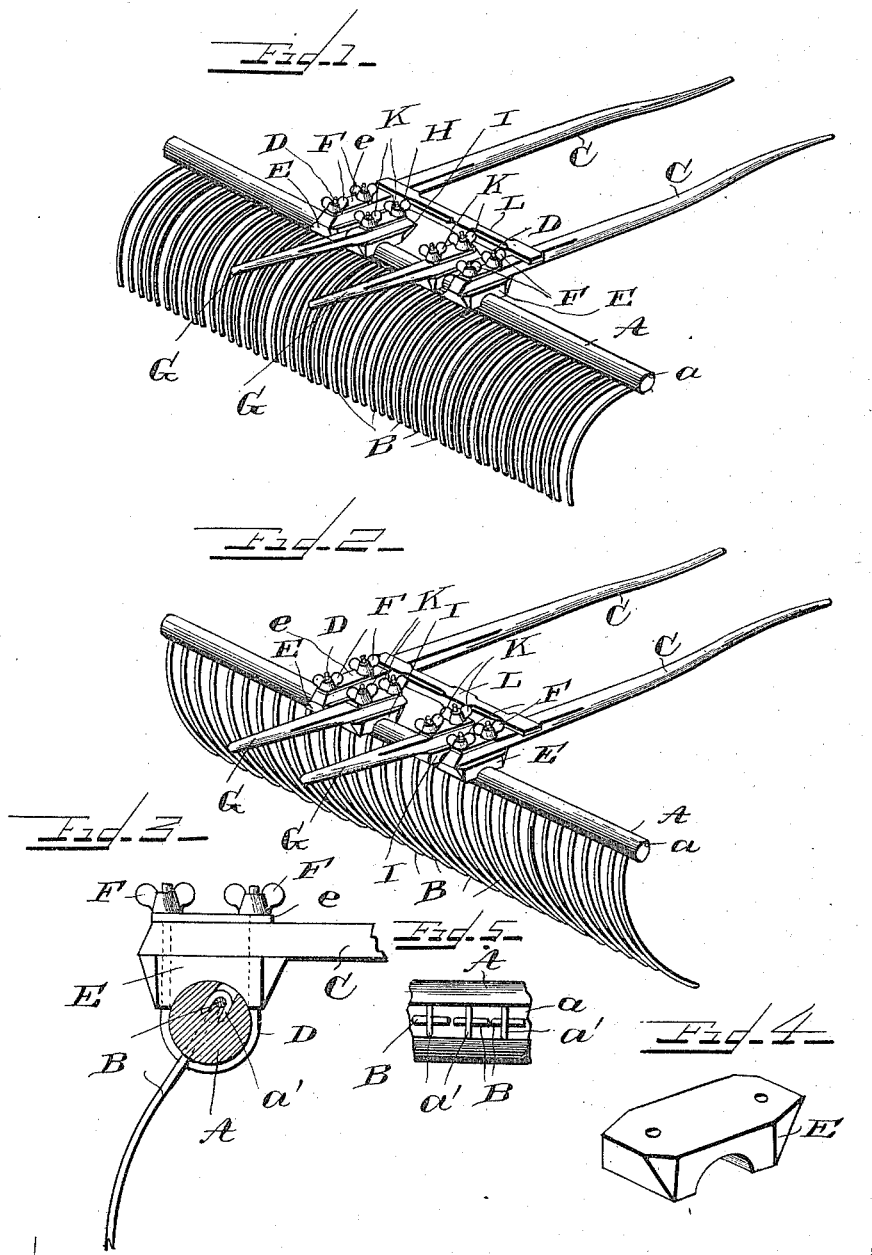
Witnesses
D. A. Pauberschmidt
E. R. Jacobsen
Inventor
Alfred S. Topping
By Edw. J. Underwood
Attorney

UNITED STATES PATENT OFFICE.

ALFRED S. TOPPING, OF HART, MICHIGAN, ASSIGNOR OF ONE-HALF TO FREDERICK A. LUTHER.

INTERCHANGEABLE WEEDER AND RAKER.

SPECIFICATION forming part of Letters Patent No. 572,935, dated December 8, 1896.

Application filed October 7, 1896. Serial No. 608,102. (No model.)

*To all whom it may concern:*

Be it known that I, ALFRED S. TOPPING, a citizen of the United States, residing at Hart, in the county of Oceana and State of Michigan, have invented certain new and useful Improvements in Interchangeable Weeders and Rakers; and I do hereby declare the following to be a full, clear, and exact description of the invention, such as will enable others skilled in the art to which it appertains to make and use the same.

My invention relates to a weeding-machine designed to be used as an implement for destroying the weeds in growing crops and for removing the same after they have been deracinated.

The object of my said invention is to provide an efficient and convenient weeder so constructed as to permit its use for weeding two or more rows of corn, potatoes, &c., at the same time, and capable of being adjusted so as to change the pitch of the teeth and convert it into a raker for the uprooted weeds.

My weeder consists of a tooth-bar or head having inserted therein a single series of curved spring-teeth, which are drawn across the ground in a rearwardly-inclined position by means of shafts adjustably attached to the head and controlled by handles, in like manner adjustably secured to the head or tooth-bar.

In the accompanying drawings, Figure 1 is a perspective view of the implement arranged as a weeder. Fig. 2 shows it adjusted as a rake. Fig. 3 is a sectional view of the tooth-bar. Fig. 4 shows one of the adjusting-blocks detached. Fig. 5 is a top plan view of a section of the tooth-bar.

A represents a cylindrical head or tooth-bar provided with a longitudinal groove $a$, extending its entire length, in which the upper ends of the curved spring-teeth B are secured by means of staples $a'$, passed over the upper tooth ends, which are bent at a right angle to fit in the groove $a$ after passing through openings in the head.

When the staples are driven home, they, as well as the tooth ends, are entirely within the groove in the tooth-bar.

C C are the shafts, which are connected with the head in such manner as to be readily adjustable thereon, in order to change the pitch of the teeth at will. This is accomplished by means of a grip-clevis D to each shaft, which surrounds the head, and its ends pass through a hollowed metallic block E, which fits upon the head and is interposed between the head and the rear ends of the shaft. The clevis ends pass through openings in the shafts and plates $e$, thereupon situated, and are screw-threaded at their extremities to receive thumb-nuts F, and by tightening these nuts the shafts are secured at any angle upon the head.

L is a brace to connect and strengthen the shafts.

G G are the handles, which in like manner are adjustably secured upon the head by means of the similar clevises H, metallic blocks I, and nuts K.

As the bent ends of the teeth and their securing-staples are entirely contained in the groove of the head they offer no obstruction to the adjustment of the shafts and handles, and thus any pitch may be given to the teeth, and the height of the handles from the ground may be regulated to suit either boy or man.

When my implement is used as a weeder and drawn along the rows of growing crops, as corn, potatoes, &c., it will stir up the soil and deracinate the weeds without injuring the growing plants.

Owing to the ready adjustability of the shafts and handles on the tooth-bar, this implement can be used either as a weeder to remove weeds from among growing crops or as a rake to gather up the weeds after they have been pulled from the ground.

The operation of my weeder is as follows: It is designed to be drawn by a single horse guided by the operator, the horse passing between the rows of corn, &c., and the teeth being inserted in the ground to a depth and at an inclination controlled by means of the handles.

When used as a rake, the teeth will be inclined forwardly to pass over the surface of the ground and gather up the pulled weeds.

I am aware that weeding devices have been patented having two or more heads provided with sets of teeth; but these are cumbersome and expensive and are not capable of being quickly and readily changed as to the pitch of the teeth or the purpose of usage, and I disclaim any such constructions.

Having thus fully described my invention, what I do claim therein as new, and desire to secure by Letters Patent, is—

In an interchangeable weeder and raker, the combination of the cylindrical head or tooth-bar A, provided with a longitudinal groove $a$, to receive the bent tooth ends, and having staples $a'$, embedded in said groove; curved spring-teeth B, passing through the head A, and secured within the groove by means of the staples; the shafts C, adjustably secured to the head; the grip-clevises D; the interposed hollowed metallic blocks E; the securing-nuts F; and the adjustable handles G, with their clevises H, blocks I, and thumb-nuts K, all constructed, arranged and operating as hereinbefore shown and described.

In testimony whereof I affix my signature in presence of two witnesses.

ALFRED S. TOPPING.

Witnesses:
M. H. COX,
A. G. SHULTZ.